Sept. 7, 1926.   C. H. CONLON   1,599,117
BICYCLE
Filed March 19, 1926

Inventor
Charles H. Conlon
By Hardway Rattin
Attorney

Patented Sept. 7, 1926.

1,599,117

UNITED STATES PATENT OFFICE.

CHARLES H. CONLON, OF GALVESTON, TEXAS.

BICYCLE.

Application filed March 19, 1926. Serial No. 95,929.

This invention relates to new and useful improvements in a bicycle.

One object of the invention is to provide a bicycle whose rear, or traction wheel is equipped with a fly wheel of novel construction, which when, applied to said rear wheel will give the bicycle more speed, make it run easier and with less vibration, will make the bicycle coast further and easier to stop and the weight of the fly wheel will give the rear bicycle wheel better traction.

Another object of the invention is to provide a special form of bicycle fly wheel that may be cheaply and easily produced and readily applied.

With the above and other objects in view this invention has particular relation to certain novel features of construction, operation and arrangement of parts, an example of which is given in this specification and illustrated in the accompanying drawings, wherein:—

Figure 1:
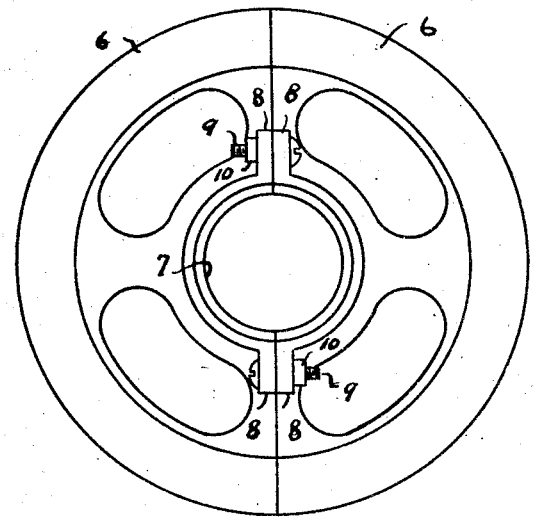
Figure 1 shows a side elevation of the fly wheel.
Figure 2:
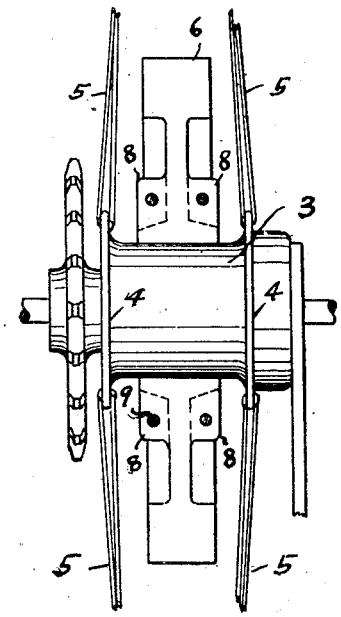
Figure 2 shows a front fragmentary view of the rear bicycle wheel showing a section of the fly wheel as applied to the coaster brake.
Figure 3:
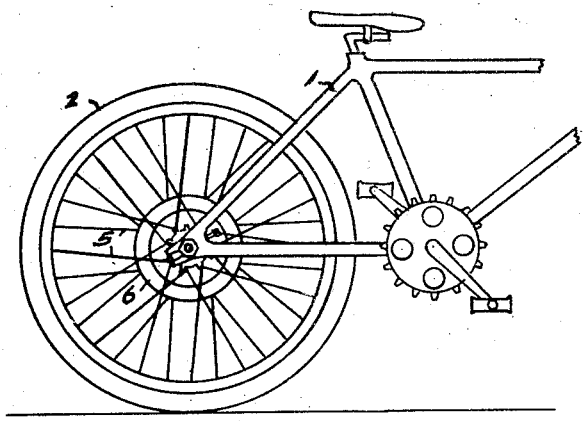
Figure 3 shows a fragmentary side view of a bicycle with the fly wheel applied to the rear wheel thereof.

Referring now more particularly to the drawings, wherein like numerals of reference designate similar parts in each of the figures the numeral 1 designates the bicycle frame and the numeral 2 shows the rear bicycle wheel. The hub of this wheel has the usual coaster brake 3 to the end flanges 4, 4, of which the usual spokes 5, are attached. Secured around the hub 3, between the spokes there is the momentum, or fly wheel, composed of the two semi-circular sections 6, 6. These sections, when fitted together, form a complete fly wheel with the central hub 7, which fits closely around the wheel hub 3. The sections 6 are formed with abutting lugs 8, 8, on each side, which fit closely together when the sections are assembled, and fitted through these lugs are suitable bolts 9, which are clamped in place by the nuts 10, to secure the sections of the wheel together as a unitary structure. This fly wheel is enclosed by the spokes so as to be completely out of the way and being formed of detachable sections may be readily removed or replaced.

By the use of this momentum wheel the pedaling of the bicycle is made easier, and more speed may be attained and the bicycle will coast further with the momentum wheel than without it and the weight of the momentum wheel will also reduce the vibration of the bicycle in running and will make it ride easier and will make it easier to stop and will give the rear bicycle wheel greater traction.

What I claim is:—

The combination with a bicycle of a momentum wheel fastened to the hub of the rear bicycle wheel and located between the spokes thereof.

In testimony whereof I have signed my name to this specification.

CHARLES H. CONLON.